United States Patent
Tsukahara et al.

(10) Patent No.: US 7,944,511 B2
(45) Date of Patent: May 17, 2011

(54) FRONT-END MODULE AND TELEVISION SET

(75) Inventors: Koki Tsukahara, Saitama (JP);
Masatomo Miyashita, Kanagawa (JP);
Naohito Nakamura, Tokyo (JP);
Mitsuru Ikeda, Saitama (JP)

(73) Assignee: Sony Corporation, Tokyo (JP)

( * ) Notice: Subject to any disclaimer, the term of this patent is extended or adjusted under 35 U.S.C. 154(b) by 1247 days.

(21) Appl. No.: 11/550,267

(22) Filed: Oct. 17, 2006

(65) Prior Publication Data

US 2007/0118859 A1 May 24, 2007

(30) Foreign Application Priority Data

Oct. 19, 2005 (JP) ................ P2005-304643

(51) Int. Cl.
*H04N 5/455* (2006.01)
(52) U.S. Cl. ............................................... 348/726
(58) Field of Classification Search .................. 348/726, 348/725, 731, 732, 552, 553; 386/95, 111–112; 725/68–71, 131, 139, 100
See application file for complete search history.

(56) References Cited

U.S. PATENT DOCUMENTS

| | | | |
|---|---|---|---|
| 6,433,831 B1 * | 8/2002 | Dinwiddie et al. | 348/553 |
| 7,643,092 B2 * | 1/2010 | Kasamatsu | 348/565 |
| 7,720,358 B2 * | 5/2010 | Yokota et al. | 386/95 |
| 2002/0059641 A1 * | 5/2002 | Tsujimura et al. | 725/135 |
| 2002/0059651 A1 * | 5/2002 | Hirata et al. | 725/153 |
| 2003/0120742 A1 * | 6/2003 | Ohgami et al. | 709/217 |
| 2006/0072752 A1 * | 4/2006 | Nakano et al. | 380/239 |
| 2006/0095947 A1 * | 5/2006 | Russ | 725/100 |
| 2006/0256241 A1 * | 11/2006 | Suzuki et al. | 348/706 |

FOREIGN PATENT DOCUMENTS

| | | |
|---|---|---|
| JP | 10-242883 | 9/1998 |
| JP | 11-225085 | 8/1999 |
| JP | 2001-313881 | 11/2001 |
| JP | 2003-069907 | 3/2003 |
| JP | 2003-204274 | 7/2003 |
| JP | 2003-218716 | 7/2003 |
| JP | 2005-006284 | 1/2005 |
| JP | 2005-136790 | 5/2005 |

OTHER PUBLICATIONS

Japanese Office Action dated Apr. 7, 2009, for corresponding JP Patent Application 2005-304643.

* cited by examiner

*Primary Examiner* — Paulos M Natnael
(74) *Attorney, Agent, or Firm* — K&L Gates LLP (57) ABSTRACT

A front-end module for receiving analog and digital broadcast signals is provided. The front-end module includes frequency conversion means, digital satellite demodulation means, intermediate frequency conversion means, analog demodulation means, digital terrestrial demodulation means, filtering means, and a grounding arrangement common to a digital and an analog circuit sections.

9 Claims, 5 Drawing Sheets

FRONT-END MODULE AND TELEVISION SET

CROSS REFERENCES TO RELATED APPLICATIONS

The present application claims priority to Japanese Patent Application JP 2005-304643 filed with the Japanese Patent Office on Oct. 19, 2005, the entire contents of which is being incorporated herein by reference.

BACKGROUND

The present application relates to a television set for receiving digital satellite broadcast signals and digital terrestrial broadcast signals. More particularly, the present application relates to a front-end module for handling these different kinds of broadcast signals.

Recent years have witnessed the start of digital terrestrial broadcasting in addition to the existing analog terrestrial broadcasting and digital satellite broadcasting. For some time to come, the analog terrestrial broadcasting and digital terrestrial broadcasting will be carried out simultaneously. If it is desired to receive these three types of broadcast signals by a single television set, the television set typically needs to be equipped with an analog terrestrial broadcast television tuner, a digital satellite broadcast television tuner, and a digital terrestrial broadcast television tuner separately. The arrangement tends to increase the number of components in the television set, with less space made available for each component to be installed inside. For example, if it is desired to build a television set capable of giving a two-screen display of all broadcast signals including digital/analog terrestrial broadcast signals, a total of six front-end packs will be necessary: two analog terrestrial front-end modules, two digital terrestrial front-end modules, and two BS/CS digital front-end modules.

There has been proposed a front-end module capable of receiving both the digital and analog terrestrial broadcast signals (e.g., see Japanese Patent Laid-open No. 2005-136790, pp. 5-6, FIG. 1). Although this type of module helps reduce the number of components inside the television set enclosure, the construction of a television set capable of two-screen display typically involves incorporating two analog terrestrial front-end/digital terrestrial front-end modules and two BS/CS digital front-end modules. These modules still encumber the limited space inside the television set.

SUMMARY

The need has thus been felt for the development of a front-end module capable of receiving all broadcast signals, with a view to improving the degree of flexibility in laying out components in a reduced-size television set capable of two-screen display of all broadcast signals including the digital/analog terrestrial broadcast signals. The challenge is how to avoid interference between the circuits for receiving the respective broadcast signals inside the module.

The present application has been made in view of the above circumstances and provides a front-end module capable of receiving the analog terrestrial broadcasting, digital terrestrial broadcasting, and digital satellite broadcasting without interference between digital and analog circuits, as well as a television set incorporating this front-end module.

According to an embodiment thereof, a front-end module for receiving analog and digital broadcast signals includes: frequency conversion means configured to convert an input BS/CS digital television broadcast RF signal into a BS/CS digital television broadcast baseband signal; digital satellite demodulation means configured to digitally demodulate the converted BS/CS digital television broadcast baseband signal; intermediate frequency conversion means configured to split an input terrestrial broadcasting RF signal into VHF, CATV, and UHF bands which are subjected to processes including tuning, amplification, and image cancellation, before converting the processed signal into a terrestrial broadcasting intermediate frequency signal; analog demodulation means configured to split the terrestrial broadcasting intermediate frequency signal into an analog audio signal and a analog video signal, before demodulating the analog audio signal and the analog video signal; digital terrestrial demodulation means configured to adjust levels of the terrestrial broadcasting intermediate frequency signal and to subject the level-adjusted signal to selective frequency band limitation, before digitally demodulating the frequency band-limited signal; filtering means configured to reduce harmonics in the demodulated signals output by the digital satellite demodulation means and the digital terrestrial demodulation means; and a grounding arrangement common to a digital and an analog circuit sections.

Preferably, the grounding arrangement may be patterned to let the return current flow in a manner inhibiting interference between the digital and the analog circuit sections.

Preferably, the frequency conversion means and the analog demodulation means may be disposed in a manner isolated from each other.

According to an embodiment, as outlined above, radiation interference with the analog demodulation means is inhibited by reducing through filtering the harmonic component in the clock signal of the transport streams stemming from the demodulation process by the digital satellite demodulation means and digital terrestrial demodulation means. The digital and analog circuit sections share a common grounding arrangement that is patterned to deal with the return current flowing from ground to the digital or analog circuit section. The frequency conversion means and analog demodulation means addressing the satellite broadcast received RF signal are disposed in a manner isolated from each other. These measures combine to suppress three kinds of interference: radiation interference with the frequency conversion means incurred from a local component of the satellite broadcast received RF signal used by the intermediate frequency conversion means for the terrestrial broadcasting RF signal; radiation interference with the intermediate frequency conversion means for the terrestrial broadcasting RF signal, incurred from an oscillation frequency signal (crystal component) of the frequency conversion means for the satellite broadcast received RF signal; and radiation interference with the intermediate frequency conversion means for the terrestrial broadcasting RF signal, incurred from a local component of the satellite broadcast received RF signal used by the frequency conversion means. Thus a single front-end module can receive the analog terrestrial broadcasting, digital terrestrial broadcasting, and digital satellite broadcasting without interference between the component circuits of the module.

According to an embodiment, one front-end module is provided to receive analog terrestrial broadcasting, digital terrestrial broadcasting, and digital satellite broadcasting. A filtering device is included in the module to reduce the harmonic component in a TS clock output constituted by demodulated signals derived from the digital terrestrial broadcasting and digital satellite broadcasting. A grounding arrangement is installed in a manner common to the digital and the analog circuit sections of the module. The analog terrestrial demodulation section is disposed isolated from the other components. The grounding pattern is designed properly to deal with the return current flowing from ground. These measures prevent radiation interference between the digital and the analog circuits so that all broadcast signals may be received in a manner free of radiation interference.

A digital/analog compatible television set designed for two-screen display may utilize this front-end module to alleviate internal space requirements, with system design made appreciably easier than before.

The front-end module in an embodiment occupies much less footprint than traditional modules. With the problem of interference thus resolved by its improvements, the front-end module installed in a shielded manner helps facilitate deliberation of design considerations on the circuit board including countermeasures against interference.

Additional features and advantages are described herein, and will be apparent from, the following Detailed Description and the figures.

DETAILED DESCRIPTION

A detailed description with reference to the figures is described below. An embodiment includes implementing one front-end module structured to receive analog terrestrial broadcasting, digital terrestrial broadcasting, and digital satellite broadcasting without interference between digital and analog circuit sections of the module. The structure according to an embodiment for receiving the different types of broadcast signals in interference-free fashion includes: a filtering section for reducing the harmonics in a TS clock output constituted by demodulated signals derived from the digital terrestrial broadcasting and digital satellite broadcasting; a grounding arrangement made common to the digital and the analog circuit sections of the module; and a analog terrestrial demodulation section disposed isolated from the other components. The grounding pattern is designed properly to deal with a return current flowing from ground.

Figure 1:
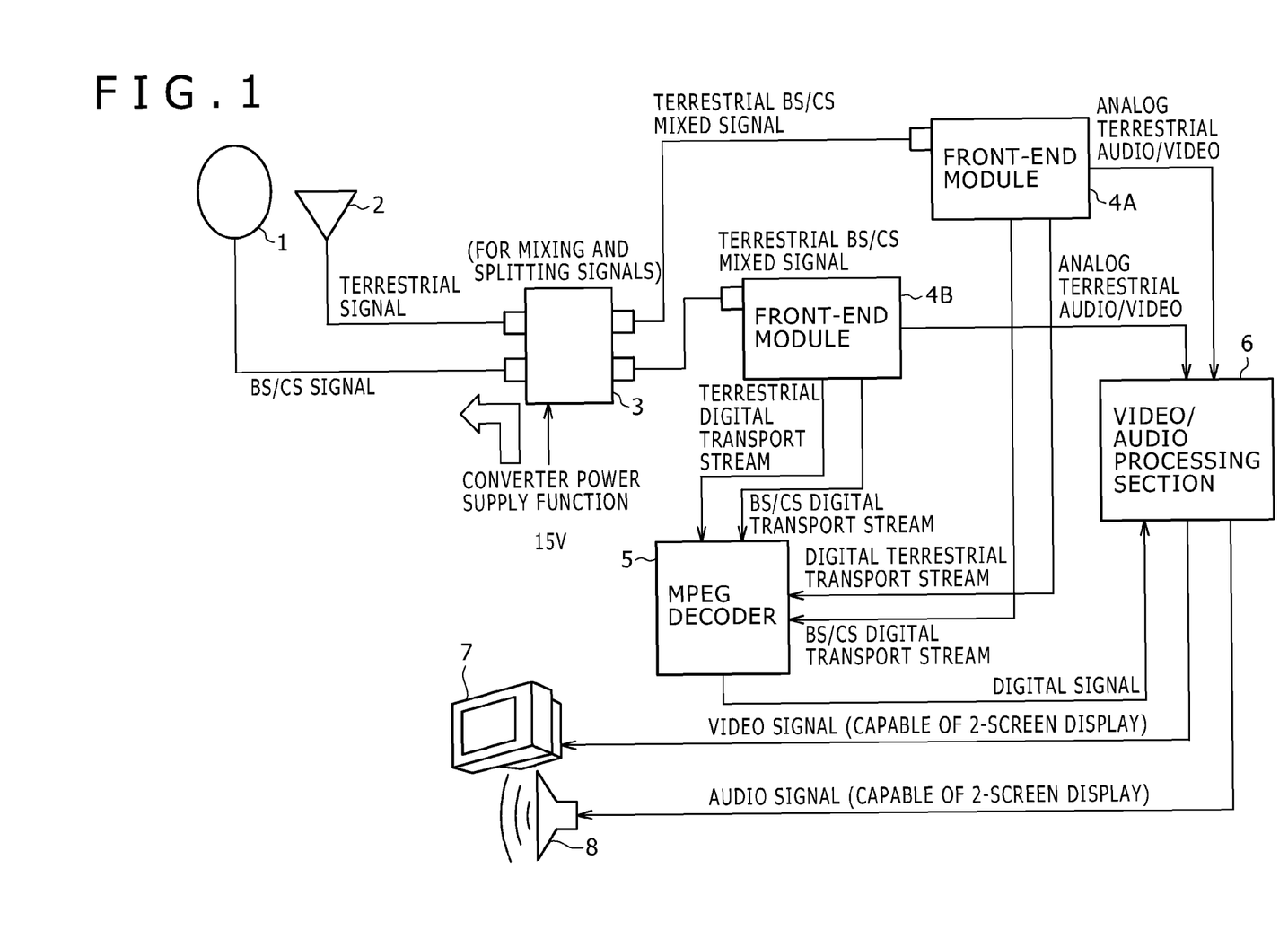
FIG. 1 is a block diagram showing a structure of a television set practiced as a first embodiment of the present invention.

FIG. 1 is a block diagram showing a structure of a television set practiced as the first embodiment of the present invention. The television set includes a splitter 3, a front-end module 4A, a front-end module 4B, an MPEG decoder 5, a video/audio processing section 6, a monitor section 7, and an audio section 8 such as speakers (earphones). The television set of this structure is connected to a BS/CS antenna 1 and a terrestrial antenna 2 and is capable of addressing both digital and analog signals for two-screen simultaneous display.

The first embodiment works as follows: satellite and terrestrial RF signals (or signals transmitted by CATV) are received by the BS/CS antenna 1 and terrestrial antenna 2 and input to the television set through cables, not shown. The input satellite and terrestrial RF signals enter the splitter 3 for mixing and splitting inside the television set. A satellite/terrestrial mixed signal comes out of the splitter 3 and enters the front-end modules 4A and 4B. The front-end modules 4A and 4B, identical in structure, are each set for a desired channel by a host microcomputer, not shown. The RF signals on the selected channels are each demodulated into a analog terrestrial audio/video signal, a digital terrestrial TS signal, and a BS/CS digital TS signal for output.

A dual stream of the digital terrestrial TS signal and the BS/CS digital TS signal is input to the MPEG decoder 5. The input signals are decoded into a dual stream of a video/audio digital signal for input to the video/audio processing section 6. A dual stream of the analog terrestrial audio/video signal is led into the video/audio processing section 2. In turn, the video/audio processing section outputs a double lineup of a video signal and an audio signal to the monitor section 7 and audio section 8. This allows the monitor section 7 to provide a two-screen display.

Figure 2:
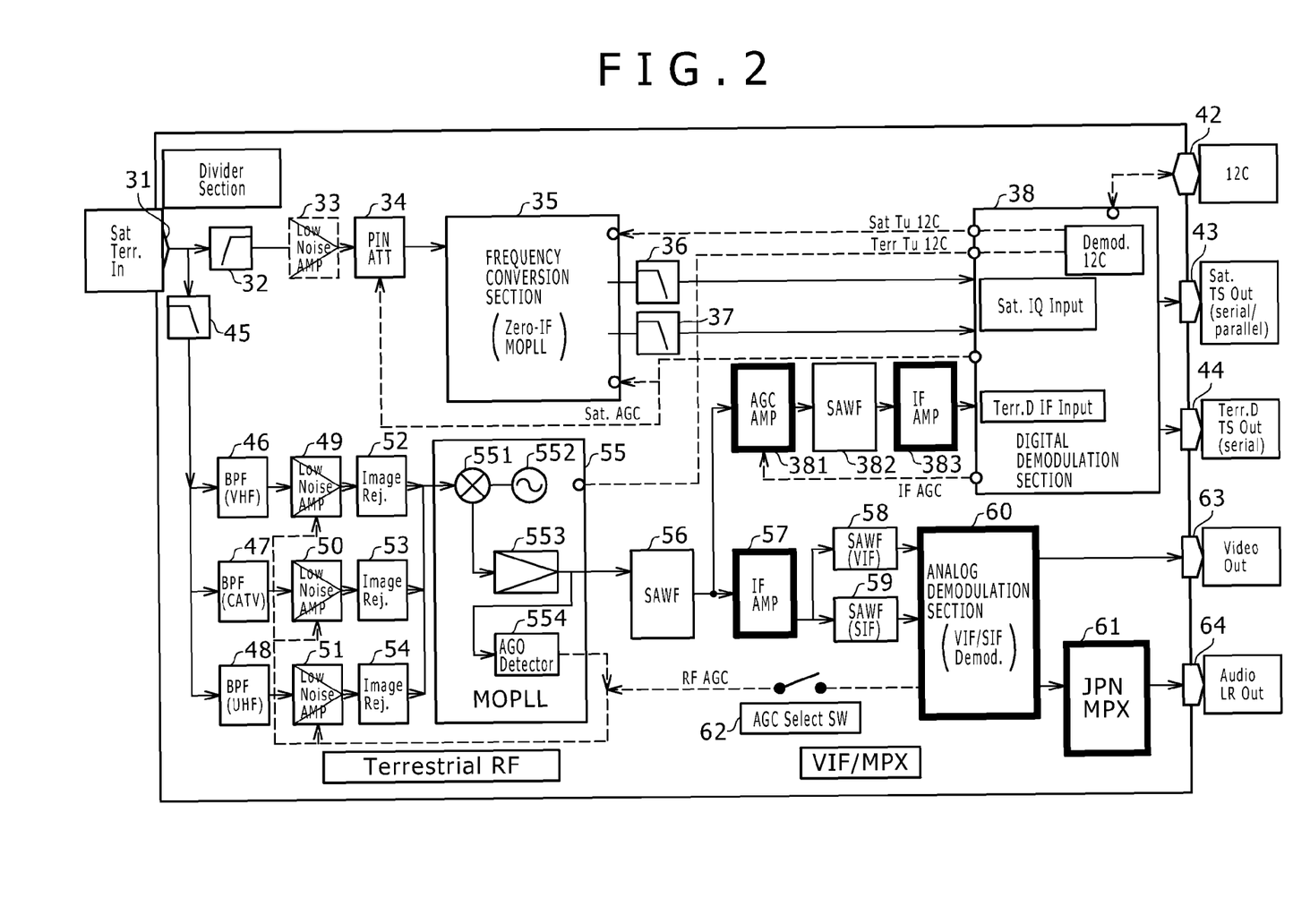
FIG. 2 is a block diagram showing a detailed structure of one front-end module included in FIG. 1.

FIG. 2 is a block diagram showing a detailed structure of the front-end module 4A (or 4B). The front-end module 4A (or 4B) includes: a branching circuit formed by a high-pass filter 32 and a low-pass filter 45; a BS/CS circuit made up of a low-noise amplifier 33, a PIN attenuator 34, a frequency conversion section (zero-IF MOPLL) 35, high-pass filters 36 and 37, and a digital demodulation section 38; a terrestrial circuit constituted by band-pass filters 46, 47, and 48, low-noise amplifiers 49, 50, and 51, image rejection circuits 52, 53, and 54, an intermediate frequency conversion section 55, and a surface wave filter 56; a analog terrestrial circuit provided as an extension of the terrestrial circuit and composed of an IF amplifier 57, a video IF filter (VIF) 58, an audio IF filter (SIF) 59, an analog demodulation section 60, a multiplexer 61, and an AGC switch 62 for activating AGC of the frequency conversion section 35 during analog terrestrial reception only; and a digital terrestrial circuit provided as an extension of the terrestrial circuit and including an AGC amplifier 381, a surface wave filter 382, an IF amplifier 383, and the digital demodulation section 38.

In operation, the satellite and terrestrial RF signals fed from the splitter 3 to an input terminal 31 are branched into the satellite RF signal and terrestrial RF signal by the high-pass filter 32 and low-pass filter 45. The satellite RF signal is amplified by the low-noise amplifier 33 before being input to the frequency conversion section 35 for the satellite signal. Given the satellite RF signal, the frequency conversion section 35 frequency-converts the signal into baseband signals. From the frequency conversion section 35, a baseband video signal and a baseband audio signal are sent to the high-pass filters 36 and 37 whereby unwanted signal components are filtered out. From the high-pass filters 36 and 37, the video and audio signals are input to the digital demodulation section 38. The digital demodulation section 38 demodulates the input video and audio signals into a BS/CS digital TS (transport stream) signal in MPEG-2 format. The demodulated BS/CS TS signal is output by the digital demodulation section 38 through a BS/CS output terminal 43.

Meanwhile, the terrestrial RF signal is input to the band-pass filters 46, 47, and 48 whereby the input signal is split into VHF, CATV, and UHF bands. The VHF, CATV, and UHF band signals are submitted respectively to the low-noise amplifiers 49, 50, and 51 for amplification and to the image rejection circuits 52, 53, and 54 for image cancellation. The result of the amplification and image cancellation is input to the intermediate frequency conversion section (MOPLL) 55 whereby RF signals of the input bands are converted into an intermediate frequency signal for output to the surface wave filter 56. The surface wave filter 56 attenuates unwanted signal components outside the input intermediate frequency signal (with a center frequency of 57 MHz) and branches the resulting signal to the digital and the analog circuits. An analog intermediate frequency signal of the analog terrestrial broadcasting is amplified by the IF amplifier 57. The amplified signal is separated by the video IF filter 58 and audio IF filter 59 into a video signal and an audio signal which are then input to the analog demodulation section 60. The analog demodulation section 60 demodulates the video and audio signals in analog form. From the analog demodulation section 60, the video signal is output through a video output terminal 63; the audio signal is output through an audio output terminal 64 by way of a multiplexer 61 for selective switchover of an audio multiplex signal.

The AGC amplifier 381 under control of the digital demodulation section 38 adjusts levels of the digital terrestrial broadcasting signal in the intermediate frequency signal having the center frequency of 57 MHz. The level-adjusted signal is fed through the surface wave filter 382 to the IF amplifier 383 for amplification. The amplified signal is input to the digital demodulation section 38 which demodulates the digital terrestrial television signal. As with the BS/CS digital signal, the digital demodulation section 38 turns the input signal into the digital terrestrial TS in MPEG-2 format for output through a terrestrial wave output terminal 44. Because the first embodiment has its terrestrial tuner section shared by the circuits for dealing with analog and digital terrestrial signals, the analog and digital terrestrial broadcast signals are difficult to be output simultaneously.

In order to have the front-end module 4A (4B) operate without interference as described above, it is necessary to resolve the following problems:

(1) The radio frequency of the BS/CS digital TS output by the digital demodulation section 38 interferes with the terrestrial wave RF band, emerging as an interference signal within the intermediate frequency signal band output by an IF amplifier 553 (this problem is called the first interference in this specification).

(2) A local component (oscillation frequency of a local oscillator 552) of the terrestrial RF section (constituted by the intermediate frequency conversion section 55) interferes with the BS/CS band, emerging as a noise in the baseband signal output by the frequency conversion section 35 (second interference).

(3) A crystal oscillator signal component used in frequency conversion by the BS/CS RF section (constituted by the frequency conversion section 35) interferes with the terrestrial RF band (made up of the intermediate frequency conversion section 55)(third interference).

(4) A local signal component (i.e., harmonics of a divided component) used in frequency conversion by the BS/CS RF section (formed by the frequency conversion section 35) interferes with the terrestrial wave RF band, emerging as an interference signal component in the intermediate frequency signal output by the IF amplifier 553 (fourth interference).

Figure 3:
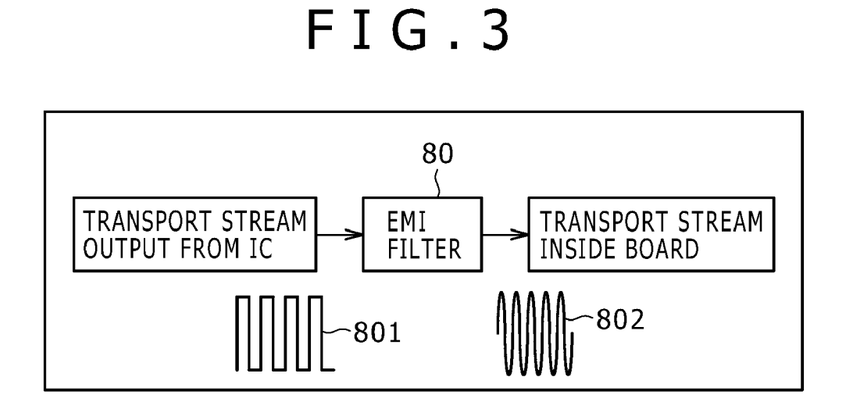
FIG. 3 is a schematic view explanatory of countermeasures taken against interference.
Figure 4A:
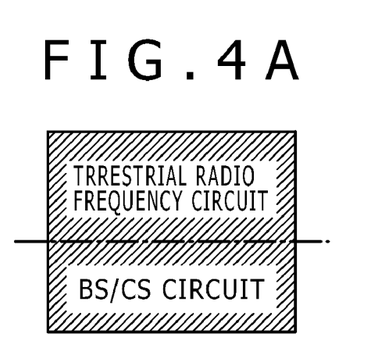
FIGS. 4A and 4B are schematic views explanatory of a grounding arrangement for use by the circuits included in FIG. 2.
Figure 4B:
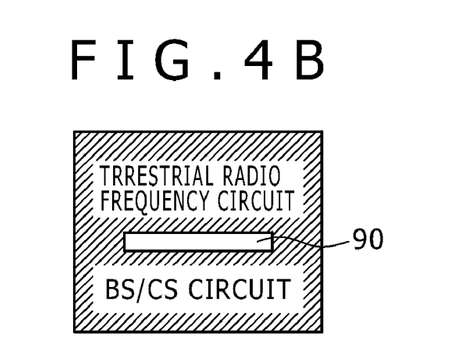
Figure 5:
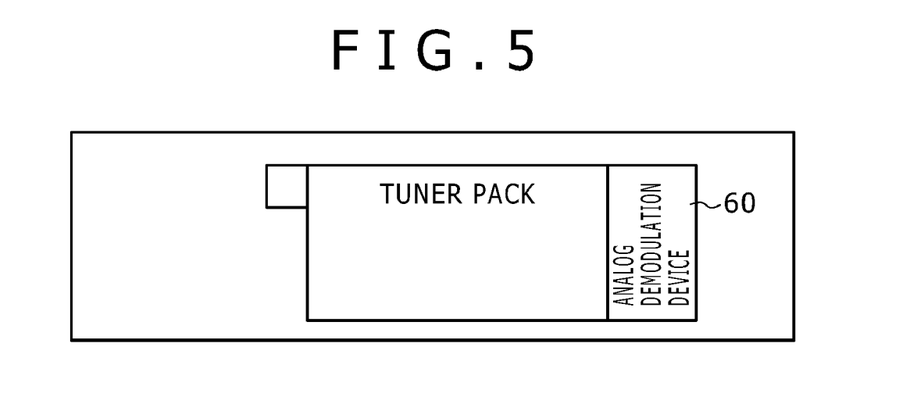
FIG. 5 is a schematic view explanatory of a typical layout of an analog demodulation section.

The first embodiment is arranged to take countermeasures as described below against the first through the fourth interference outlined above. The first interference is dealt with by attenuating its harmonic component as shown in FIG. 3. More specifically, the TS clock output (waveform 801) from the digital demodulation section 38 is filtered by an EMI filter 80 whereby a waveform 802 is obtained. This attenuation setup renders the radiation interference with the terrestrial wave RF practically harmless. The second, the third, and the fourth interference above are usually countered by separating the digital circuit section (composed of the frequency conversion section 35, digital demodulation section 38, etc.) from the analog circuit section. With the first embodiment, by contrast, these types of interference are dealt with by making a grounding arrangement common to the BS/CS RF circuit (frequency conversion section 35) as part of the digital circuit section and to the terrestrial wave RF circuit (intermediate frequency conversion section 55) as part of the analog circuit section, as shown in FIG. 4A. At the same time, as shown in FIG. 4B, an opening 90 is included by design in the otherwise-solid grounding arrangement to allow for the return current flowing through ground. That is, the grounding arrangement is patterned in such a manner that the return current coming from the power supply of the analog circuit section through ground will stay immediately below or close to the analog circuit. This grounding pattern is intended to prevent the digital and the analog circuits from interfering with each other by way of the return current. The analog demodulation section 60 for the terrestrial broadcasting, which is the most vulnerable section to interference, is set apart and located at an edge of the circuit board (i.e., tuner pack) as shown in FIG. 5.

According to the first embodiment, the harmonic component of the TS clock output is filtered out; common ground is shared by the digital and the analog circuit sections; the analog terrestrial demodulation section 60 is positioned in an isolated manner; and the grounding pattern is designed properly to allow for the return current flowing through ground. These measures combine to suppress the radiation interference between the digital and the analog circuit sections so that a single front-end module 4A (or 4B) can receive the analog terrestrial broadcasting, digital terrestrial broadcasting, and digital satellite broadcasting free of interference.

When it is desired to implement a television set capable of receiving all of the analog terrestrial broadcasting, digital terrestrial broadcasting, and digital satellite broadcast signals and capable of providing two-screen display of all these broadcast signals, the television set need only incorporate two front-end modules 4A and 4B. The television set is thus simplified in structure with the reduced number of internal components. With its internal space requirements alleviated in this manner, the television set can be easily designed to be appreciably smaller in size than before.

Figure 6:
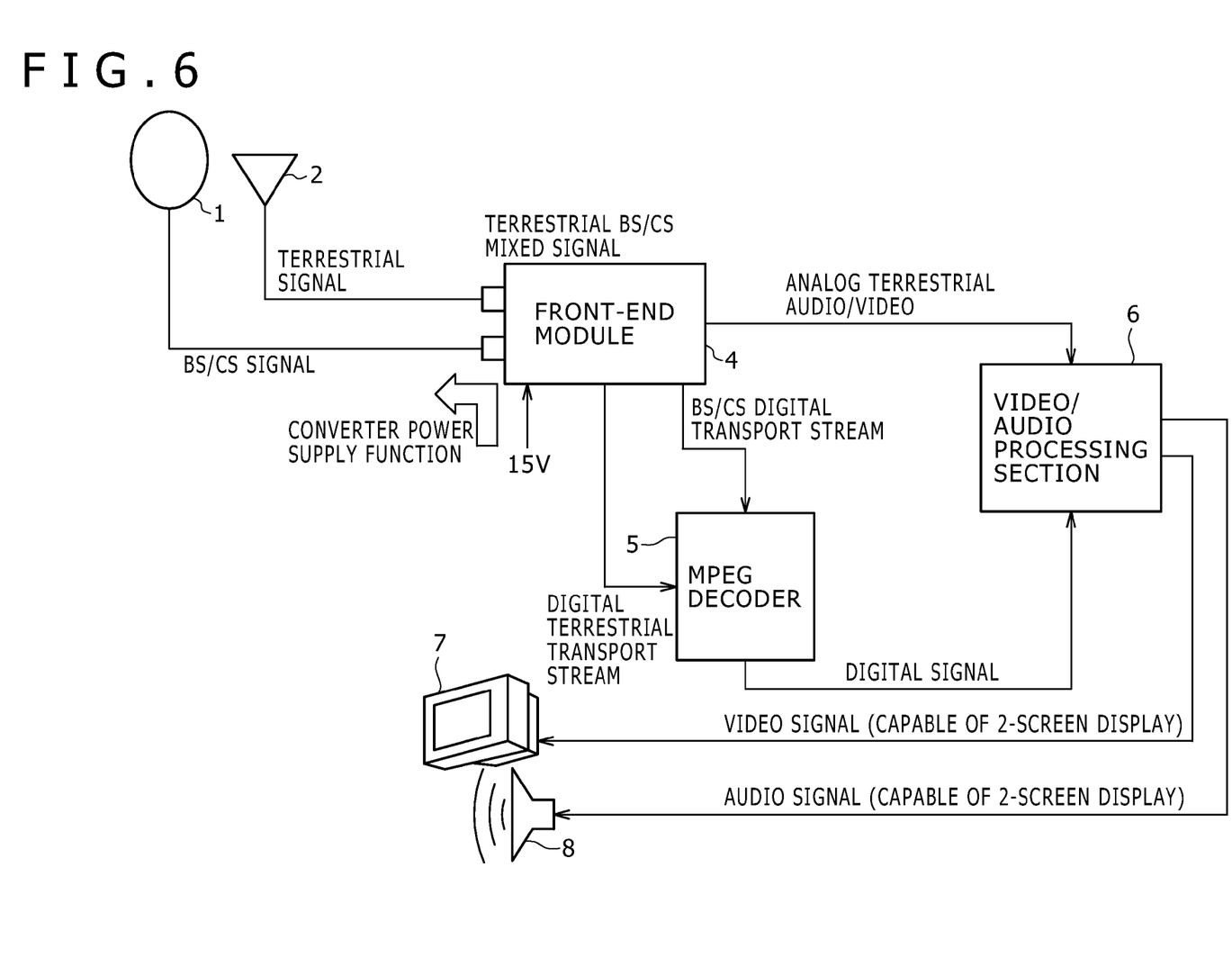
FIG. 6 is a block diagram showing a structure of a television set practiced as a second embodiment of the present invention.

FIG. 6 is a block diagram showing a structure of a television set practiced as the second embodiment of the present invention. In describing the second embodiment, the components that are substantially the same in function as those already discussed in connection with the first embodiment will be designated by the same reference numerals. The television set as the second embodiment has one front-end module 4 capable of receiving and demodulating all of the analog terrestrial broadcasting, digital terrestrial broadcasting, and digital satellite broadcasting. The front-end module is designed to provide a single-screen display of digital and analog broadcast signals. A BS/CS antenna 1 and a terrestrial antenna 2 are thus connected to the front-end module 4. The output side of the front-end module 4 is connected with an MPEG decoder 5 for single-stream processing, a video/audio processing section 6, a monitor section 7, and an audio section 8 such as speakers (earphones).

Figure 7:
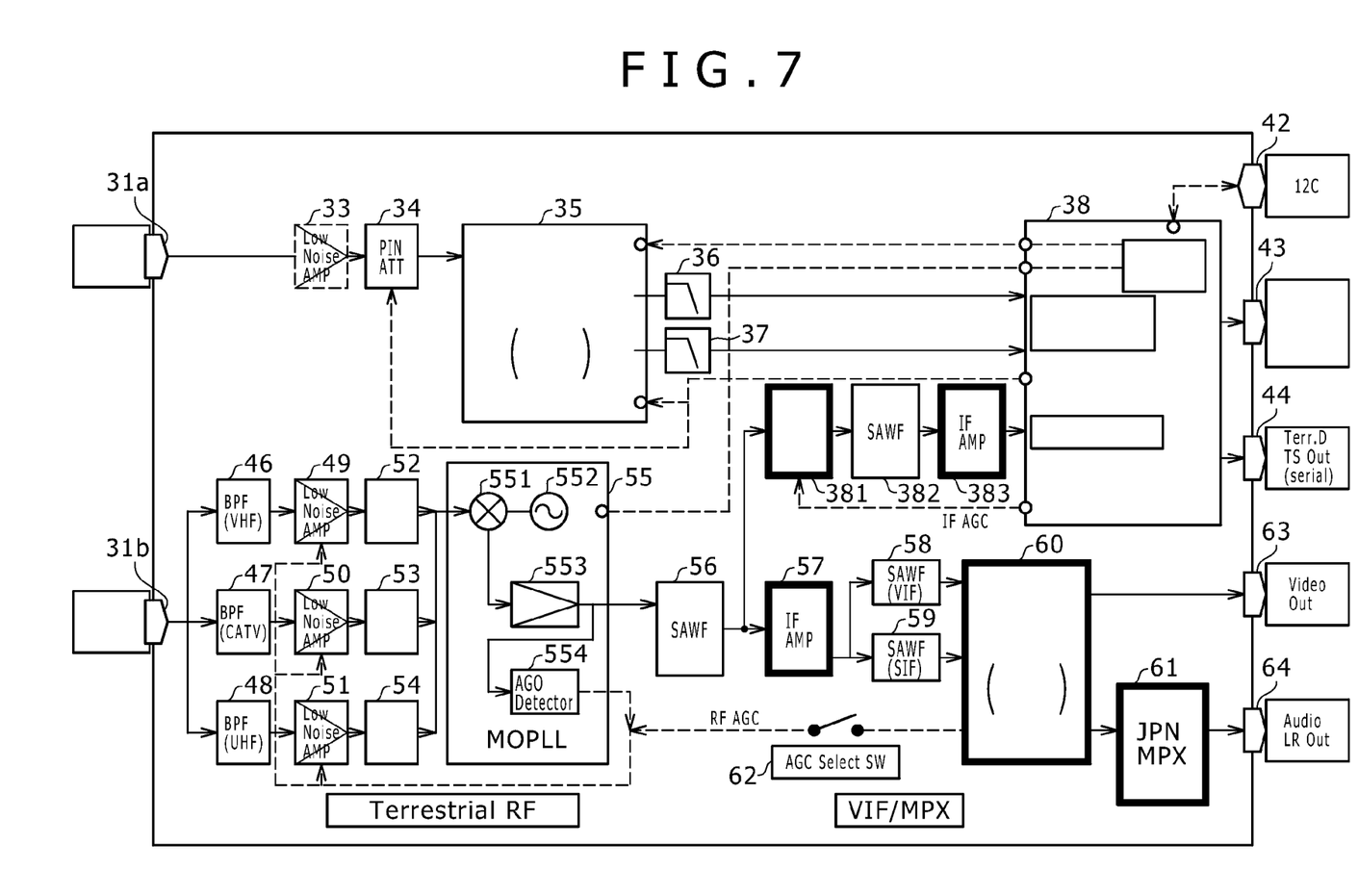
FIG. 7 is a block diagram showing a detailed structure of the front-end module included in FIG. 6.

FIG. 7 is a block diagram showing a detailed structure of the front-end module 4 in FIG. 6. In the input section of the front-end module 4, a satellite wave input section 31a is separated from a terrestrial wave input section 31b. For that reason, a power supply function for supplying 15V to the BS/CS antenna 1 is located in the module and there is no branching circuit inside. The other components of the structure are substantially the same as their counterparts in the detailed structure of the front-end module shown in FIG. 2; these components operate in substantially the same manner.

With the second embodiment incorporating the front-end module 4, the harmonic component of the TS clock output is likewise filtered out; common ground is shared by the digital and the analog circuit sections; the analog terrestrial demodulation section 60 is positioned in an isolated manner; and the grounding pattern is designed suitably to allow for the return current flowing through ground. These measures in combination suppress the radiation interference between the digital and the analog circuit sections. Since the television set is designed for single-screen display, one front-end module 4 inside the set takes care of all of the analog terrestrial broadcasting, digital terrestrial broadcasting, and digital satellite broadcasting. With its components inside still fewer in number, the television set can be structured to be much smaller than before.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A front-end module for receiving analog and digital broadcast signals, comprising:
frequency conversion means configured to convert an input BS/CS digital television broadcast RF signal into a BS/CS digital television broadcast baseband signal;
digital satellite demodulation means configured to digitally demodulate said BS/CS digital television broadcast baseband signal;
intermediate frequency conversion means configured to split an input terrestrial broadcasting RF signal into VHF, CATV, and UHF bands which are subjected to processes including tuning, amplification, and image cancellation, before converting the processed signal into a terrestrial broadcasting intermediate frequency signal;
analog demodulation means configured to split said terrestrial broadcasting intermediate frequency signal into an analog audio signal and a analog video signal, before demodulating said analog audio signal and said analog video signal;
digital terrestrial demodulation means configured to adjust levels of said terrestrial broadcasting intermediate frequency signal and to subject the level-adjusted signal to selective frequency band limitation, before digitally demodulating the frequency band-limited signal;
filtering means configured to reduce harmonics in the demodulated signals output by said digital satellite demodulation means and said digital terrestrial demodulation means; and
a grounding arrangement common to a digital and an analog circuit sections.

2. The front-end module according to claim 1, wherein said grounding arrangement is patterned in such a manner that a return current from a power supply for said analog circuit section stays in a ground either immediately below or close to said analog circuit section.

3. The front-end module according to claim 1, wherein said frequency conversion means and said analog demodulation means are disposed in such a manner as to be isolated from each other.

4. The front-end module according to claim 1, further comprising a branching circuit configured to branch an input RF signal into a BS/CS digital television broadcast RF signal and a terrestrial broadcasting RF signal.

5. The front-end module according to claim 1, wherein said digital satellite demodulation means and said digital terrestrial demodulation means are implemented by a single LSI chip, and wherein the demodulated output signals from said LSI chip are MPEG-2 transport streams.

6. A television set for receiving analog and digital broadcast signals, comprising:
a front-end module configured to receive an input BS/CS digital television broadcast RF signal, demodulate the received signal into a demodulated signal, and output the demodulated signal as a transport stream, said front-end module further receiving an input terrestrial broadcasting and demodulating the received broadcast analogically into analog terrestrial video/audio signals, said front-end module further demodulating digitally said terrestrial broadcasting into a demodulated signal and outputting the demodulated signal as a transport stream;
decoding means configured to decode the transport streams output by said front-end module into digital video/audio signals;
video/audio processing means configured to process said analog terrestrial video/audio signals output by said front-end module and said digital video/audio signals decoded by said decoding means, into a video signal and an audio signal in output form;
video output means configured to output said video signal output by said video/audio processing means; and
audio output means configured to output said audio signal output by said video/audio processing means,
wherein said front-end module includes:
frequency conversion means configured to convert an input BS/CS digital television broadcast RF signal into a BS/CS digital television broadcast baseband signal;
digital satellite demodulation means configured to digitally demodulate said BS/CS digital television broadcast baseband signal;
intermediate frequency conversion means configured to split an input terrestrial broadcasting RF signal into VHF, CATV, and UHF bands which are subjected to processes including tuning, amplification, and image cancellation, before converting the processed signal into a terrestrial broadcasting intermediate frequency signal;
analog demodulation means configured to split said terrestrial broadcasting intermediate frequency signal into an analog audio signal and a analog video signal, before demodulating said analog audio signal and said analog video signal;
digital terrestrial demodulation means configured to adjust levels of said terrestrial broadcasting intermediate frequency signal and to subject the level-adjusted signal to selective frequency band limitation, before digitally demodulating the frequency band-limited signal;
filtering means configured to reduce harmonics in the demodulated signals output by said digital satellite demodulation means and said digital terrestrial demodulation means; and
a grounding arrangement common to a digital and an analog circuit sections.

7. The television set according to claim 6, further comprising two units of said front-end module, said decoding means, and said video/audio processing means each in order to provide two-screen display.

8. The television set according to claim 6, wherein said grounding arrangement is patterned in such a manner that a return current from a power supply for said analog circuit section stays in a ground either immediately below or close to said analog circuit.

9. The television set according to claim 6, wherein said frequency conversion means and said analog demodulation means are disposed in a manner isolated from each other.

* * * * *